(12) United States Patent
Ku

(10) Patent No.: US 7,355,849 B2
(45) Date of Patent: Apr. 8, 2008

(54) NON-METAL MESH COVER FOR METAL CHASSIS

(75) Inventor: Shih-Chang Ku, Taipei (TW)

(73) Assignee: VIA Technologies, Inc. of R.O.C., Taipei (TW)

( * ) Notice: Subject to any disclaimer, the term of this patent is extended or adjusted under 35 U.S.C. 154(b) by 85 days.

(21) Appl. No.: 11/512,515

(22) Filed: Aug. 30, 2006

(65) Prior Publication Data

US 2007/0184245 A1    Aug. 9, 2007

(51) Int. Cl.
*H05K 7/20* (2006.01)

(52) U.S. Cl. .................. 361/690; 361/708; 428/143
(58) Field of Classification Search .............. None
See application file for complete search history.

(56) References Cited

U.S. PATENT DOCUMENTS

| 5,565,274 | A | * | 10/1996 | Perrone et al. | ............. 428/457 |
| 5,681,640 | A | * | 10/1997 | Kiser | .......... 428/181 |
| 6,002,584 | A | * | 12/1999 | Messmer et al. | ........... 361/690 |
| 6,358,595 | B1 | | 3/2002 | Kobayashi | .................. 428/143 |
| 6,970,360 | B2 | * | 11/2005 | Sinha | .......... 361/752 |

* cited by examiner

*Primary Examiner*—Gregory D Thompson
(74) *Attorney, Agent, or Firm*—Kirkpatrick & Lockhart Preston Gates Ellis LLP

(57) ABSTRACT

The present invention relates to a chassis structure for an electronic system containing a plurality of electronic components therein. The present invention provides a composite chassis structure comprising a nonmetal mesh cover formed on one or more surfaces of the metal chassis to obtain additional thermal budget and human-friendly chassis surface.

20 Claims, 4 Drawing Sheets

NON-METAL MESH COVER FOR METAL CHASSIS

BACKGROUND OF THE INVENTION

The present invention relates to a chassis structure for an electronic system containing a plurality of electronic components therein. More particularly, the present invention provides a composite chassis structure comprising a nonmetal mesh cover formed on one or more surfaces of the metal chassis to obtain additional thermal budget and human-friendly chassis surface.

A chassis in a television, DVD player, or other electronic device has a metal frame on which the circuit boards and other electronic components are mounted. In computers, various components including motherboard, microprocessor, memory, disk drives, and other electronic components are mounted on the chassis. Generally, a computer chassis is composed of a number of panels as shown in FIG. 1. A computer chassis protects all of the vital internal components from dust, moisture, and tampering and is usually made of metal to dissipate heat generated by various electronic components of the computer system.

In its normal operation within a computer, microprocessors (CPU) are the major source of heat dissipation on a computer. If there is no cooling system in the computer, its temperature will reach well over 100° C. If not properly dissipated, the heat generated within the computer can reduce the lifetime of electronic components and also degrade the operation of the components. Heat from a computer may be passively dissipated by warming the outside surface (skin) of the plastic or housing material over the ambient air or actively dissipated through an outlet by using a fan and heat exchanger.

Safety regulations, for example UL-1950, specify different skin temperatures for metal chassis and nonmetal chassis due to the different heat dissipation rate for each chassis. For example, a typical maximum skin temperature of 55° C. is set for a metal chassis, while that of 65° C. is set for a plastic chassis. Accordingly, system manufacturers can obtain additional 10° C. skin temperature margin by adopting a nonmetal chassis. Also, a nonmetal chassis including plastic chassis is more friendly to human skin than a metal chassis.

Conventional chassis is made of either single layered metal or nonmetal material such as plastic. However, non-metallic chassis is generally not effective in dissipating heat and shielding electromagnetic emissions into the environment surrounding the computer compared with metallic chassis. On the other hand, metal chassis is subject to a much tighter skin temperature allowance by 10° C. compared with nonmetallic chassis as explained above.

As such, it is desirable to devise a new chassis structure where both effective heat dissipation and additional thermal budget in terms of skin temperature can be obtained.

BRIEF SUMMARY OF THE INVENTION

The present invention relates to a chassis structure for an electronic system containing a plurality of electronic components therein. More particularly, the present invention provides a composite chassis structure comprising a nonmetal mesh cover formed on one or more surfaces of the metal chassis to obtain additional thermal budget and human-friendly chassis surface. Merely by way of example, the invention has been applied to a composite chassis structure of a computer system. However, it would be recognized that the invention has a much broader range of applicability as well.

In a specific embodiment, the invention provides a composite chassis having a higher skin temperature allowance than a metallic chassis for an electronic system containing a plurality of electronic components therein. The chassis includes at least one metal panel for dissipating heat generated by the plurality of the electronic components. The chassis further includes at least one nonmetal mesh cover having a plurality of openings for dissipating heat therefrom and preventing direct human contact with the metal panel, wherein the nonmetal mesh cover has a higher skin temperature allowance than the metal panel and is formed on the outer surface of the metal panel.

In another embodiment, the invention provides a method for forming a composite chassis having a higher skin temperature allowance than a single-layered metallic chassis for an electronic system containing a plurality of electronic components therein. The method includes placing a plurality of electronic components on a metal panel of the electronic system. The method further includes forming a nonmetal mesh cover having a plurality of openings on the outer surface of the metal panel by securely attaching the nonmetal mesh cover to the metal panel to avoid a direct human contact with the metal panel.

Many benefits are achieved by way of embodiments of the present invention over conventional techniques. For example, the present technique provides a thermally non-conductive mesh cover formed on the thermally conductive metallic chassis to protect end user from accidental direct contact with potentially hot metal chassis, while maintaining a heat dissipating capacity of the metal chassis. In addition, the present technique provides additional thermal budget in terms of chassis skin temperature to manufacturers of the electronic system and other aesthetic benefits by forming a composite chassis structure.

Other objects, features and advantages of the present invention will become apparent from the following description of the embodiments of the invention taken in conjunction with the accompanying drawings.

BRIEF DESCRIPTION OF THE DRAWINGS

The accompanying drawings illustrate the present invention and, together with the description, further serve to explain the principles of the invention and to enable a person skilled in the pertinent art to make and use the invention.

DETAILED DESCRIPTION OF THE INVENTION

The present invention relates to a chassis structure for an electronic system containing a plurality of electronic components therein. More particularly, the present invention provides a composite chassis structure comprising a nonmetal mesh cover formed on one or more surfaces of the metal chassis to obtain additional thermal budget and human-friendly chassis surface. Merely by way of example, the invention has been applied to a composite chassis structure of a computer system. However, it would be recognized that the invention has a much broader range of applicability as well.

Figure 1:
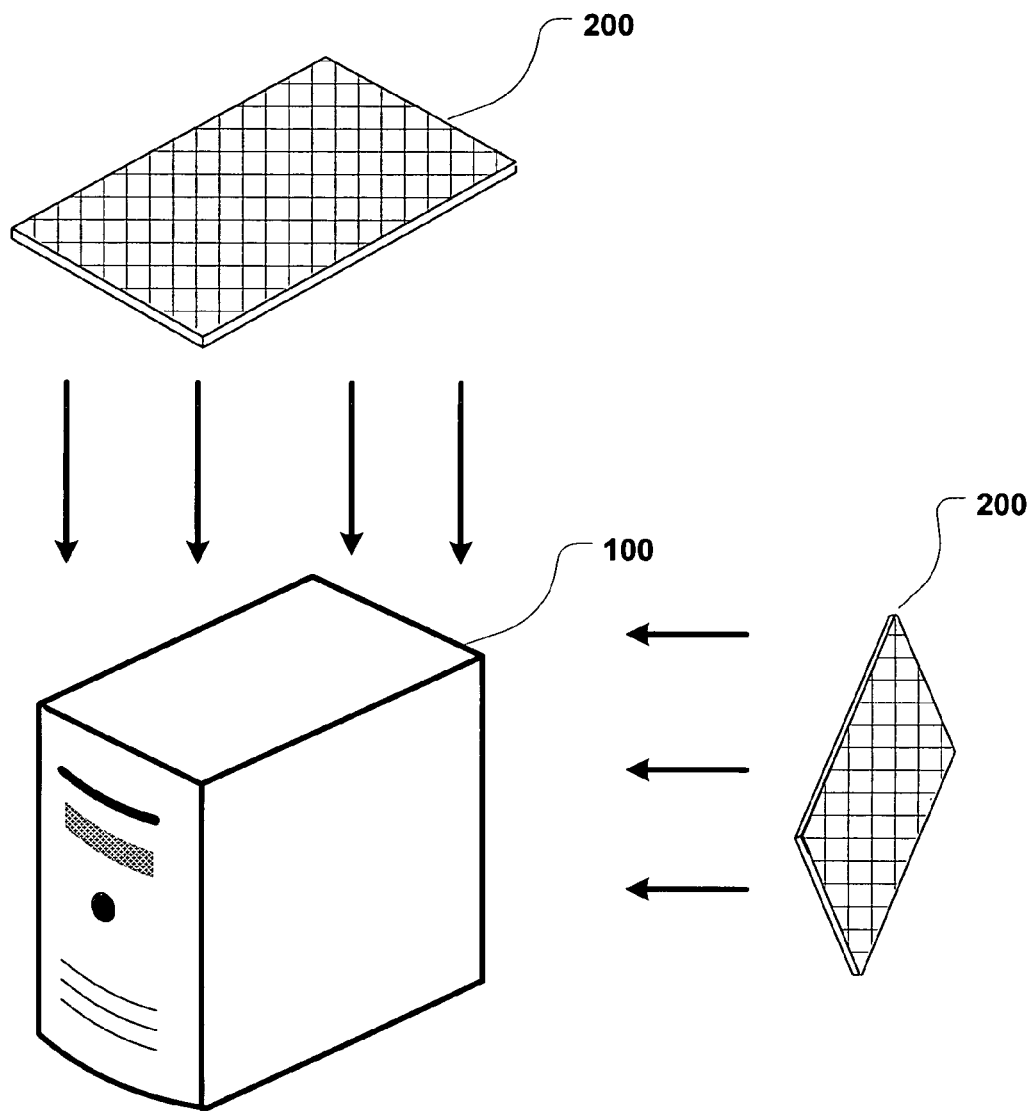
FIG. 1 is a simplified perspective view of a computer system having a composite chassis.

FIG. 1 is a simplified perspective view of a computer system having a composite chassis structure. In this embodiment, a computer chassis 100 is comprised of a number of duralumin metal panels. As shown in FIG. 1, the nonmetal mesh cover 102 is placed on the outer surface of the metal chassis to form a composite chassis structure comprising a nonmetallic mesh cover formed on the metal panel. The nonmetal mesh cover comprises a thermally less conductive material than the metal chassis material. For example, polycarbonate can be used as nonmetal mesh material. The mesh cover 102 can either be securely attached to one or more of the panels of the metal chassis by screw, glue, or other attachment mechanism to obtain additional thermal budget and prevent any accidental direct human contact with metal chassis.

Figure 2:
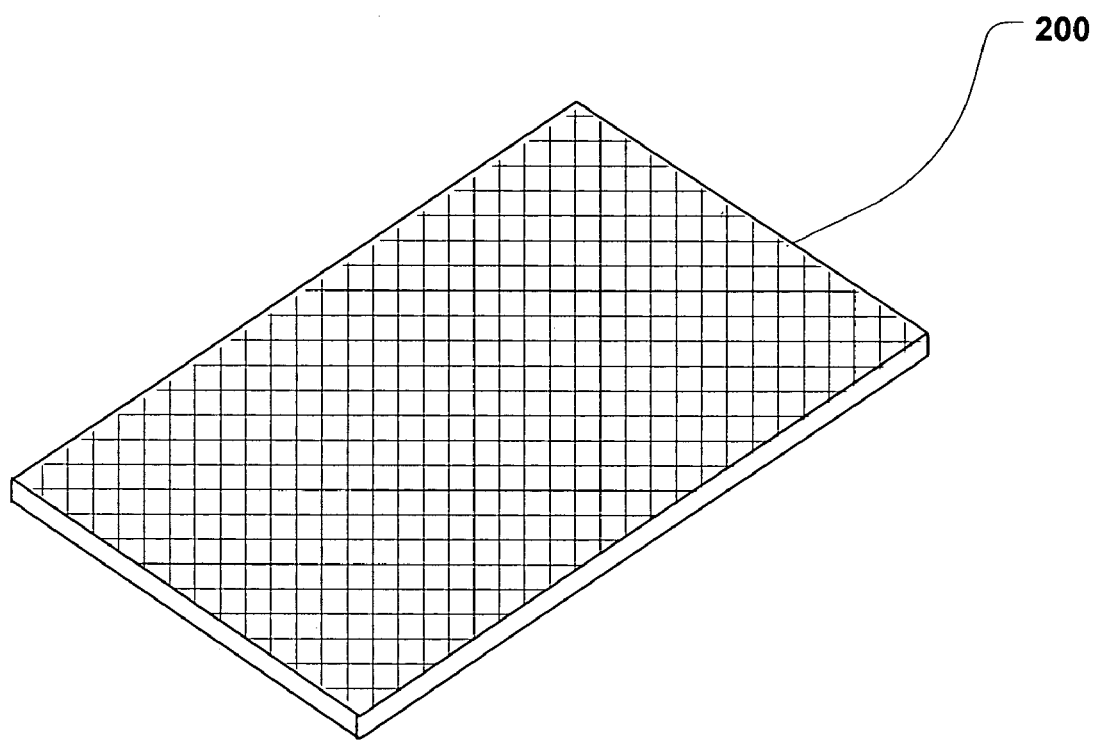
FIG. 2 is a perspective view of a nonmetal mesh cover.

FIG. 2 is a perspective view of a nonmetal mesh cover. As FIG. 2 illustrates, the mesh cover 200 has a plurality of openings to allow heat dissipation from the metal chassis into the environment surrounding the computer. In an embodiment, the openings are rectangular in shape and occupy about at least 25% or more of the entire mesh cover surface. Alternatively, openings of other proportions and shapes are possible. According to an evaluation performed by using the computational fluid dynamics (CFD) test, a nonmetallic mesh cover having a plurality of openings shows excellent skin temperature characteristic as further described below with reference to FIG. 3.

Figure 3:
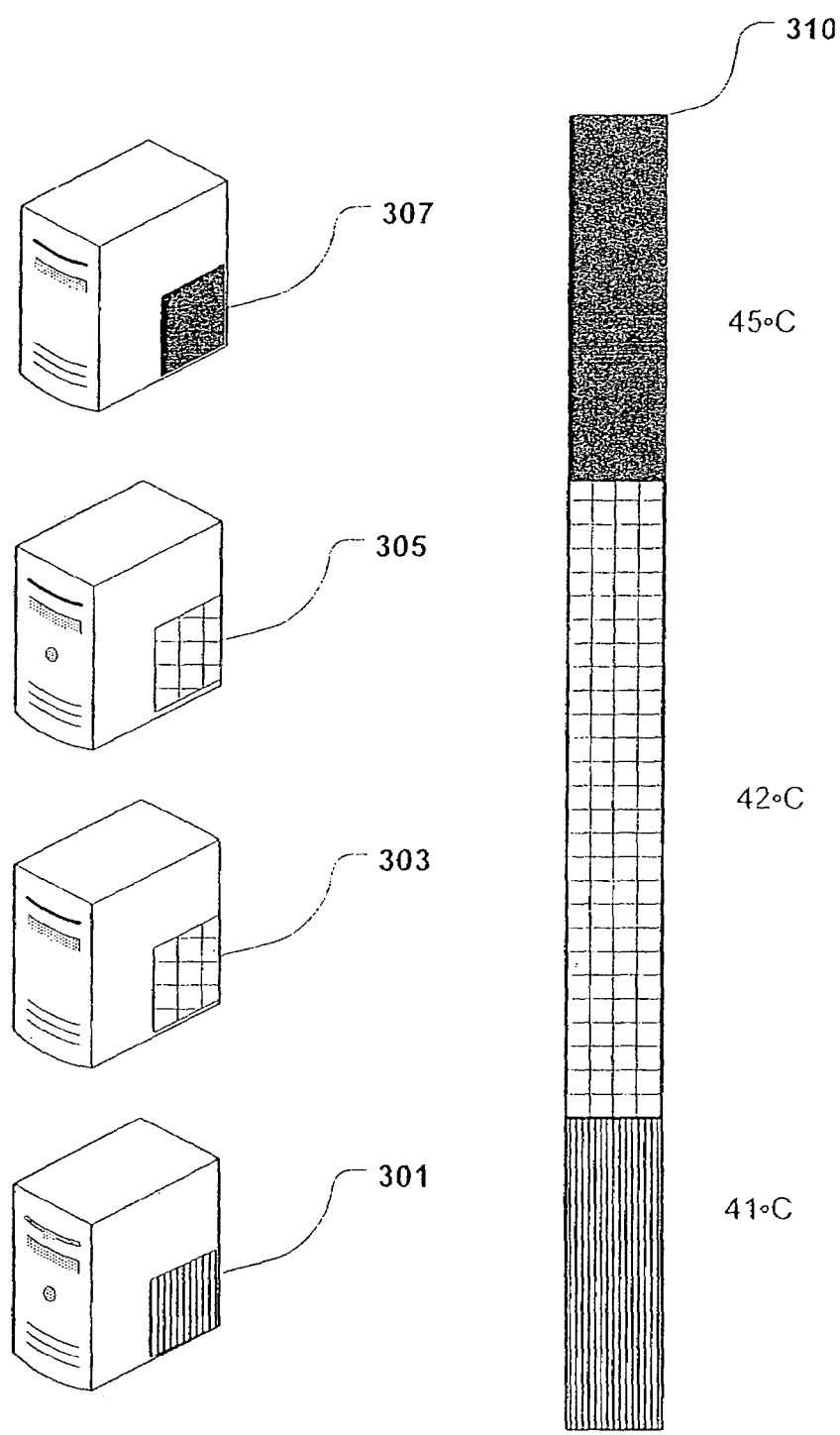
FIG. 3 illustrates chassis skin temperature distributions evaluated by computational fluid dynamics (CFD) test for different types of chassis structures.

FIG. 3 is a schematic illustration of the computer chassis skin temperature distributions evaluated by the computational fluid dynamics (CFD) test with respect to four different types of chassis structures. Computational fluid dynamics (CFD) test is a sophisticated analysis tool that can be used to find a solution to excess heat problems in an electronic system like a computer. Using CFD test, the chassis skin temperature distributions inside a computer system can be evaluated as illustrated in FIG. 3. The chassis skin temperature distributions for four different types of chassis including a metal chassis 301, a composite chassis 303 and 305 having a different mesh opening size, and a nonmetal chassis 307 made of Nylon-6 are illustrated in FIG. 3.

In FIG. 3, the grey or dark spot illustrates the temperature distributions of the metal chassis 301, composite chassis 303 and 305, and nonmetal chassis 307 at a location where high heat dissipating devices like microprocessors are located. The skin temperature is illustrated by different color as represented by a temperature scale bar 310.

The chassis 303 and 305 are exemplary composite chassis according to an embodiment of the present invention. To form a composite chassis, a nonmetal mesh cover made of polycarbonate is attached to an outer surface of the metal chassis by various methods. For example, the mesh cover can be fixed to the surface of the metal chassis with screws or glue for secure attachment. Alternatively, the mesh cover can be snapped into locking holes formed on the surface of the underlying metal chassis or can be slid into one or more rails formed on the metal chassis.

The mesh cover has a plurality of openings to dissipate heat from the underlying metal chassis and obtain additional skin temperature allowance. As an embodiment, the mesh openings having a dimension of 1×1 mm$^2$ and 2×2 mm$^2$ with the mesh opening rate of at least of 25% or more of the entire mesh surface are used for the composite chassis 303 and 305 respectively. However, the mesh cover can have varying number of openings with different dimension and different opening rate to dissipate heat from the underlying metal chassis. For example, the more porous the mesh cover is, the more rapidly heat can escape from the metal chassis.

Referring to FIG. 3, the CFD test of the thermal distribution for the four different types of chassis indicates that the composite chassis 303 and 305 show a comparable skin temperature characteristic to the metal chassis 301. As illustrated in FIG. 3, no significant chassis skin temperature variation is observed between the metal chassis 301 and the composite chassis 303 and 305. As FIG. 3 shows, the non-metal mesh cover formed on the metal chassis does not affect the overall chassis skin temperature by more than 1 degree, while achieving about 10° C. of additional thermal design budget under the safety regulations. According to another CFD test, not shown here, the nonmetal mesh cover of the present embodiment does not affect the temperature distribution of the electronic components enclosed by the metal chassis. In contrast, the plain plastic chassis 307 shows a severe hot spot indicating a high localized chassis temperature, as illustrated in FIG. 3.

Figure 4:
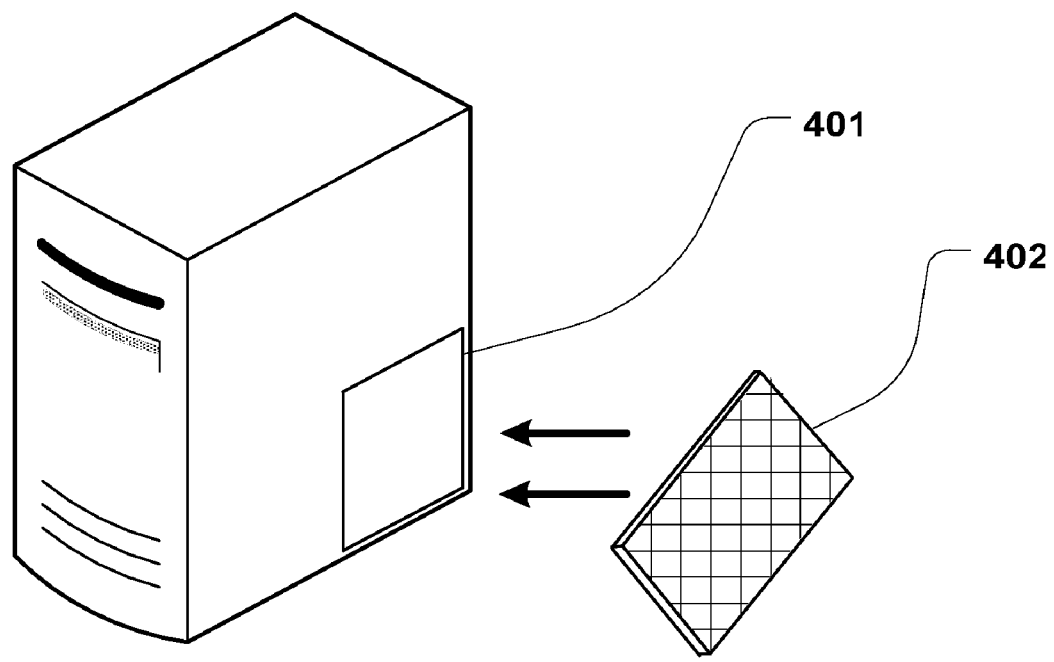
FIG. 4 is a simplified perspective view of a computer system having a nonmetal mesh enclosing a metal mesh attached to an opening of one or more chassis panels.

FIG. 4 is a simplified perspective view of a computer system having a nonmetal mesh enclosing a metal mesh attached to an opening of one or more chassis panels. As another embodiment of the present invention, a nonmetal mesh enclosing a metal mesh 402 is attached to an opening 401 formed on one of the metal panels to reduce a high localized chassis skin temperature problem caused by microprocessors or other high heat emitting components. As stated above, microprocessors (CPU) are one of the major sources of high heat dissipation on a computer. The localized hot spot 307 observed in FIG. 3 is usually caused by microprocessors or other high heat dissipating electronic elements. If not properly cooled, its temperature will reach well over 100° C. Thus, excessive heat from the microprocessors in a computer, for example, can be actively dissipated through an outlet by using a fan and heat exchanger, together with the nonmetal mesh enclosing a metal mesh as shown in FIG. 4 to further obtain additional skin temperature allowance.

As the theory of thermodynamics, the heat flux depends on the gradient of temperature and the thermo-conductivity of the material. In other words, the total heat dissipating capacity of the electronic system depends on the surface temperature of the electronic system. However, the surface temperature is restricted in accordance with the material of the chases because the material with high thermo-conductivity causes more heat flux which may induce the hazard of human body. According to the above-described embodiments, a thermally nonconductive mesh cover can be formed on the thermally conductive chassis to protect end user from accidental contact with potentially hot metal chassis, while maintaining the heat dissipating capacity of the metal chassis. Although various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A composite chassis composed of a metal chassis for an electronic system containing a plurality of electronic components therein, the composite chassis comprising:
   at least one metal panel for dissipating heat generated by the plurality of the electronic components; and
   at least one nonmetal mesh cover attached to an outer surface of the metal panel having a plurality of openings for preventing direct human contact with the metal panel and obtaining an additional skin temperature allowance.

2. The composite chassis of claim 1 wherein the metal panel comprises duralumin.

3. The composite chassis of claim 1 wherein the nonmetal mesh cover comprises a thermally less conductive material than the material of the metal panel.

4. The composite chassis of claim 1 wherein the nonmetal mesh cover comprises polycarbonate.

5. The composite chassis of claim 1 wherein the openings are in rectangular shape.

6. The composite chassis of claim 1 wherein the nonmetal mesh cover has a skin temperature allowance about 10° C. higher than that of the metal panel.

7. The composite chassis of claim 1 wherein the electronic system is a computer.

8. A method for forming a composite chassis composed of a metal chassis for an electronic system, the method comprising:
   placing a plurality of electronic components within the composite chassis; and
   providing a nonmetal mesh cover having a plurality of openings on at least a portion of an outer surface of a metal panel of the composite chassis by securely attaching the nonmetal mesh cover to the metal panel to prevent a direct human contact with the metal panel and provide additional chassis skin temperature allowance.

9. The method of claim 8 wherein the nonmetal mesh cover comprises a thermally less conductive material than the metal panel.

10. The method of claim 9 wherein the nonmetal mesh cover comprises polycarbonate.

11. The method of claim 8 wherein the openings are in rectangular shape.

12. The method of claim 8 wherein a mesh opening rate is at least 25% of the entire surface of the nonmetal mesh cover.

13. The method of claim 8 wherein the metal panel comprises duralumin.

14. The method of claim 8 wherein the nonmetal mesh cover has a skin temperature allowance about 10° C. higher than the metal panel.

15. The method of claim 8 wherein the nonmetal mesh cover is attached to the outer surface of the metal panel by one or more screws.

16. The method of claim 8 wherein the nonmetal mesh cover is attached to the outer surface of the metal panel by glue.

17. The method of claim 8 wherein the nonmetal mesh cover is snapped into at least one or more locking holes formed on the surface of the metal panel.

18. A chassis composed of a metal chassis for an electronic system containing a plurality of electronic components therein, the chassis comprising:
   one or more metal panels having an opening; and
   a nonmetal mesh enclosing a metal mesh, wherein the nonmetal mesh has a higher skin temperature allowance than the metal mesh,
   wherein the nonmetal mesh enclosing the metal mesh is securely attached to the opening for dissipating heat.

19. The chassis of claim 18 wherein the nonmetal mesh has a skin temperature allowance about 10° C. higher than the one or more panels.

20. The chassis of claim 18 wherein the opening is formed on at least a portion of the one or more panels from which one or more microprocessors are closely located.

* * * * *